(12) United States Patent
Nam

(10) Patent No.: US 11,242,438 B2
(45) Date of Patent: Feb. 8, 2022

(54) COVER WINDOW AND DISPLAY DEVICE INCLUDING THE SAME

(71) Applicant: SAMSUNG DISPLAY CO., LTD., Yongin-si (KR)

(72) Inventor: Seung Wook Nam, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 622 days.

(21) Appl. No.: 14/851,694

(22) Filed: Sep. 11, 2015

(65) Prior Publication Data
US 2016/0280873 A1 Sep. 29, 2016

(30) Foreign Application Priority Data

Mar. 25, 2015 (KR) ........................ 10-2015-0041814

(51) Int. Cl.
B32B 27/06 (2006.01)
C08J 7/04 (2020.01)
C08J 7/043 (2020.01)
C08J 7/046 (2020.01)

(52) U.S. Cl.
CPC .............. *C08J 7/042* (2013.01); *C08J 7/043* (2020.01); *C08J 7/046* (2020.01); *B32B 27/06* (2013.01); *B32B 2255/28* (2013.01); *B32B 2307/536* (2013.01); *B32B 2457/20* (2013.01); *C08J 2300/00* (2013.01); *C08J 2367/02* (2013.01); *C08J 2369/00* (2013.01); *C08J 2379/08* (2013.01); *C08J 2433/06* (2013.01); *C08J 2483/04* (2013.01); *Y10T 428/2495* (2015.01); *Y10T 428/24975* (2015.01)

(58) Field of Classification Search
CPC .... C08J 7/042; C08J 2300/00; C08J 2333/12; C08J 2367/02; C08J 2369/00; C08J 2379/08; C08J 2433/06; C08J 2483/04
See application file for complete search history.

(56) References Cited

U.S. PATENT DOCUMENTS 6,329,041 B1 * 12/2001 Tsuchiya ................ C08J 7/0423
428/195.1
7,781,068 B2 * 8/2010 Nakamura ............... G02B 1/14
428/481
2005/0238879 A1 * 10/2005 Shoshi .................... B32B 23/08
428/412

(Continued)

FOREIGN PATENT DOCUMENTS

FR 2727416 A1 * 5/1996 ............ C07F 5/027
KR 10-2006-0082470 A 7/2006
KR 10-2014-0022321 A 2/2014

OTHER PUBLICATIONS

FR-2727416-A1 Machine Translation.*

*Primary Examiner* — Travis M Figg
(74) *Attorney, Agent, or Firm* — Lewis Roca Rothgerber Christie LLP

(57) ABSTRACT

A cover window includes: a base film, and a coating layer positioned on the base film, and the coating layer includes a thermosetting coating layer and a photocurable coating layer. A display device includes: a display panel, and a cover window positioned on the display panel, and the cover window includes a base film, and a coating layer positioned on the base film, and the coating layer includes a thermosetting coating layer and a photocurable coating layer.

6 Claims, 6 Drawing Sheets

(56) References Cited

U.S. PATENT DOCUMENTS

| | | | |
|---|---|---|---|
| 2007/0291367 A1* | 12/2007 | Hamamoto | C08J 7/043 359/601 |
| 2008/0014532 A1* | 1/2008 | Kessel | B24B 7/228 430/311 |
| 2008/0138597 A1* | 6/2008 | Asai | C08J 7/042 428/220 |
| 2010/0327493 A1* | 12/2010 | Fong | G03F 7/038 264/401 |
| 2011/0070448 A1* | 3/2011 | Matsumura | B32B 27/36 428/412 |
| 2011/0318567 A1* | 12/2011 | Hildenbrand | C09D 7/70 428/313.9 |
| 2013/0034685 A1* | 2/2013 | An | H01L 27/1262 428/121 |
| 2013/0177748 A1* | 7/2013 | Hirai | B32B 27/283 428/203 |
| 2013/0194211 A1* | 8/2013 | Shinohara | G02B 5/3083 345/173 |
| 2013/0331476 A1* | 12/2013 | Bae | C08J 7/0427 522/148 |
| 2014/0003060 A1* | 1/2014 | Okada | G02B 5/02 362/311.02 |
| 2015/0212300 A1* | 7/2015 | Kubo | C08G 59/24 359/754 |

\* cited by examiner

COVER WINDOW AND DISPLAY DEVICE INCLUDING THE SAME

CROSS-REFERENCE TO RELATED APPLICATION

This application claims priority to and the benefit of Korean Patent Application No. 10-2015-0041814, filed on Mar. 25, 2015 in the Korean Intellectual Property Office, the entire content of which is incorporated herein by reference.

BACKGROUND

1. Field

Aspects of embodiments of the present invention relate to a cover window and a display device including the same.

2. Description of the Related Art

Recently, various mobile electronic devices, such as a portable phone, a navigation device, a digital camera, an electronic book, a portable game console, or various kinds of terminals, to which a liquid crystal display (LCD) or an organic electroluminescent display (e.g., organic light emitting diode, OLED) is applied as a display device, have been used.

In a general display device used in the mobile devices, a cover window having transparency so that, a user can see a display unit is provided at a front of a display panel. Since the cover window is formed at the outermost side of the device, the cover window should be strong against external impact so as to protect the display panel and the like in the devices.

Moreover, instead of an existing manner where a switch: or a keyboard is used as an input device, recently, a structure where a touch panel integrated with a display image is used has come into wide use, and, thus, as compared to an existing mobile device, cases where a surface of the cover window comes into contact with a finger and the like frequently occur and require stronger strength.

Further, recently, research of a flexible display device has been actively conducted, and it is preferable that a cover window applied to this display device be formed of a foldable member having flexibility.

The above information disclosed in this Background section is only for enhancement of understanding of the background of the invention, and therefore it may contain information that does not form the prior art that is already known in this country to a person of ordinary skill in the art.

SUMMARY

According to aspects of embodiments of the present invention, a foldable cover window for a display device has surface hardness at a predetermined level or more and prevents or substantially prevents a yellowing phenomenon, and a display device includes the same.

According to one or more exemplary embodiments of the present invention, a cover window includes: a base film, and a coating layer positioned on the base film, and the coating layer includes a thermosetting coating layer and a photocurable coating layer.

The thermosetting coating layer may be positioned on the base film, and the photocurable coating layer may be positioned on the thermosetting coating layer.

The photocurable coating layer may include two photocurable coating layers, and the thermosetting coating layer may foe positioned between the two photocurable coating layers.

The photocurable coating layer may include at least one of an iodine-based initiator or a sulfuric acid-based initiator.

The iodine-based initiator may include a compound represented by the following Chemical Formula 1; and the sulfuric acid-based initiator may include a compound represented by the following Chemical formula 2.

(Chemical Formula 1)

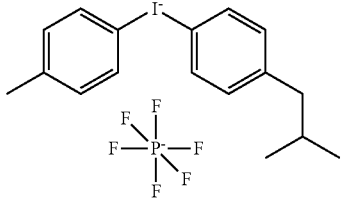

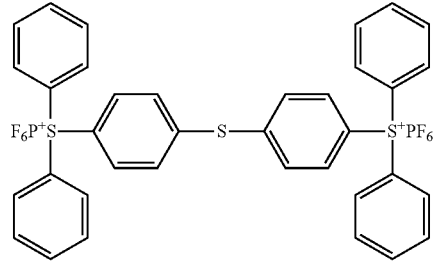

(Chemical Formula 2)

The thermosetting coating layer may include a boric acid-based initiator.

The boric acid-based initiator may include a compound represented by the following Chemical Formula 3.

(Chemical Formula 3)

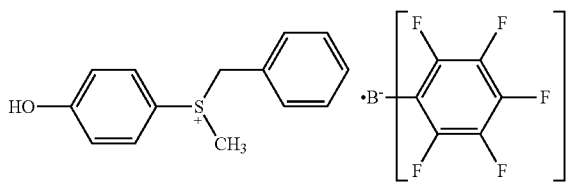

A thickness of the coating layer may be 100 μm or less.

A thickness of the photocurable coating layer may be 40% or less of a total thickness of the coating layer.

According to another exemplary embodiment of the present invention, a display device includes: a display panel, and a cover window positioned on the display panel, and the cover window includes a base film, and a coating layer positioned on the base film, and the coating layer includes a thermosetting coating layer and a photocurable coating layer.

The thermosetting coating layer may be positioned on the base film, and the photocurable coating layer may be positioned on the thermosetting coating layer.

The photocurable coating layer may include two photocurable coating layers, and the thermosetting coating layer may be positioned between the two photocurable coating layers.

The photocurable coating layer may include at least one of an iodine-based initiator or a sulfuric acid-based initiator.

The iodine-based initiator may include a compound represented by the following Chemical Formula 1, and the sulfuric acid-based initiator may include a compound represented by the following Chemical Formula 2.

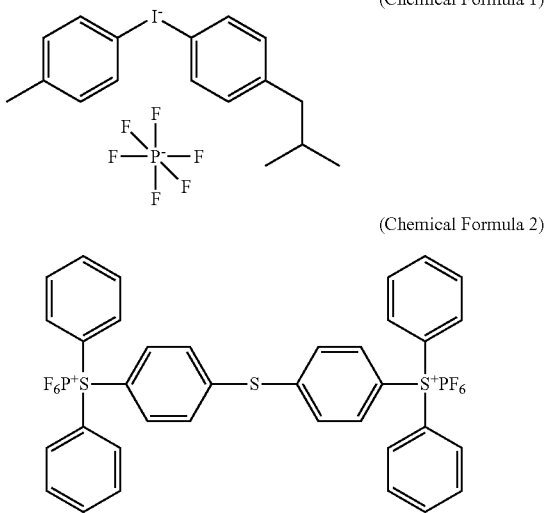

(Chemical Formula 1)

(Chemical Formula 2)

The thermosetting coating layer may include a boric acid-based initiator.

The boric acid-based initiator may include a compound represented by the following Chemical Formula 3.

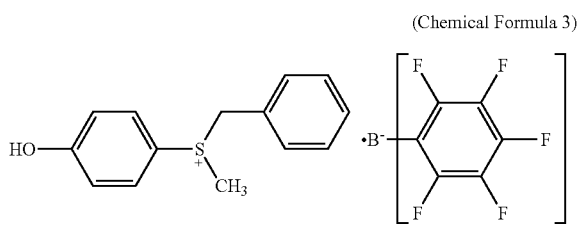

(Chemical Formula 3)

A thickness of the coating layer may be 100 μm or less.

A thickness of the photocurable coating layer may be 40% or less of a total thickness of the coating layer.

According to aspects of embodiments of the present invention, in a cover window and a display device including the same, by forming a coating layer including a predetermined material on a base film, it is possible to implement a foldable cover window having surface hardness at a predetermined level or more and; suppressing a yellowing phenomenon.

Figure 1:
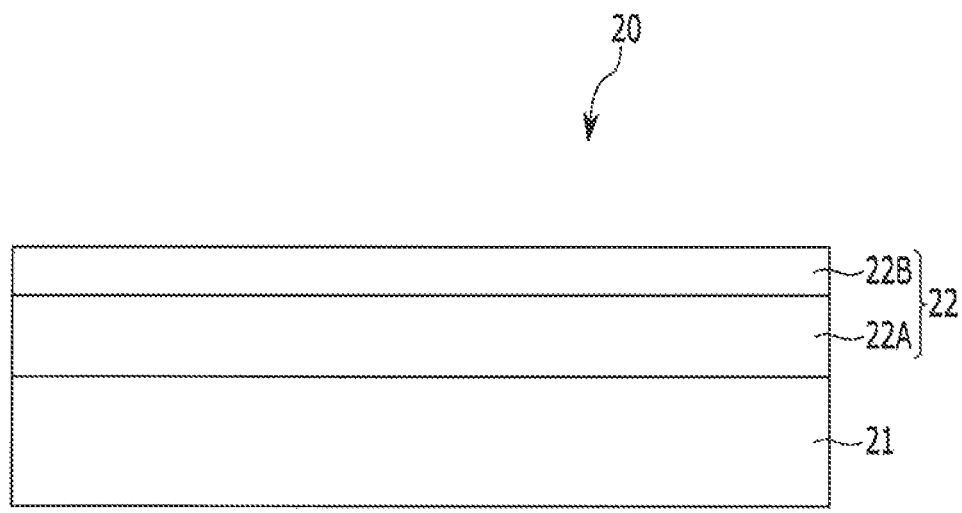
FIG. 1 is a schematic cross-sectional view of a cover window according to an exemplary embodiment of the present invention.

| Description of Reference Numerals Indicating Some Elements in the Drawings | |
|---|---|
| 10: Display panel | 20: Cover window |
| 21: Base film | 22: Coating layer |
| 30: Flexible printed circuit | 50: Printed circuit board (PCB) |

DETAILED DESCRIPTION

Aspects and features of some exemplary embodiments of the present invention are described more fully hereinafter with reference to the accompanying drawings, in which some exemplary embodiments of the present invention are shown. This invention may, however, foe embodied in different forms and should not be construed as limited to the embodiments set forth herein. Rather, these embodiments are provided in order to convey the scope of the present invention to those skilled in the art. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification, it will be understood that when an element such as a layer, film, region, or substrate is referred to as being "on" another element, it can be directly on the other element or intervening elements may also be present. In contrast, when an element is referred to as being "directly on" another element, there are no intervening elements present.

A cover window according to an exemplary embodiment of the present invention will be reviewed with reference to FIG. 1. FIG. 1 is a schematic cross-sectional view of the cover window according to an exemplary embodiment of the present invention.

A cover window 20 according to an exemplary embodiment of the present invention includes a base film 21 and a coating layer 22 positioned on the base film 21.

The base film 21 is formed of a plastic film such as polyethylene terephthalate (PEF), polycarbonate (PC), polyimide (PI), and/or polymethylmethacrylate) (PMMA).

The coating layer 22 is positioned on the base film 21, and is formed of a material such as an organic hybrid resin, an inorganic hybrid resin, and/or an acryl resin.

In an exemplary embodiment of the present invention, only the coating layer 22 positioned directly on the base film 21 is described, but exemplary embodiments of the present invention are not limited thereto, and any type of cover window is feasible. For example, in addition to the coating layer and the base film including the constitution described herein, a constitution including an adhesive layer attaching the coating layer and the base film is feasible.

The coating layer 22 according to an exemplary embodiment of the present invention is formed by applying a predetermined coating solution on the base film 21 and curing the coating solution. Referring to FIG. 1, a coating solution including a thermosetting initiator forms a thermosetting coating layer 22A on the base film 21, and a coating solution including a photocurable initiator forms a photocurable coating layer 22B on the thermosetting coating layer 22A.

According to an exemplary embodiment of the present invention, a thickness of the coating layer 22 including the thermosetting, coating layer 22A and the photocurable coating layer 22B may be 100 μm or less, and a thickness of the photocurable coating layer 22B may be 40% or less of a total thickness of the coating layer 22. That is, the thickness of the photocurable coating layer 22B may be 40 μm or less, and the thickness of the thermosetting coating layer 22A may be 60 μm or more.

The coating layer 22 according to an exemplary embodiment of the present invention may provide hardness at a predetermined level or more through the photocurable coating layer 22B positioned at the outermost region, and may suppress a yellowing phenomenon through the thermosetting coating layer 22A positioned beneath the photocurable coating layer 22B.

Each coating solution forming the coating layers 22A and 22B according to an exemplary embodiment of the present invention may include an initiator, a monomer, and a solvent.

The coating solution according to an exemplary embodiment of the present invention includes the initiator, and particularly, may include the photocurable initiator and the thermosetting initiator. The coating solution forming the photocurable coating layer may include the photocurable initiator, and the coating solution forming the thermosetting coating layer may include the thermosetting initiator.

First, the photocurable initiator may be any kind where a reaction occurs according to radiation of light, and, for example, the photocurable initiator may include an iodine-based initiator and a sulfuric acid-based initiator. For example, the iodine-based initiator may include a compound represented by the following Chemical Formula 1, and the sulfuric acid-based initiator may include a compound represented by the following Chemical Formula 2.

(Chemical Formula 1)

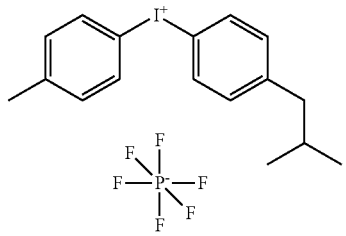

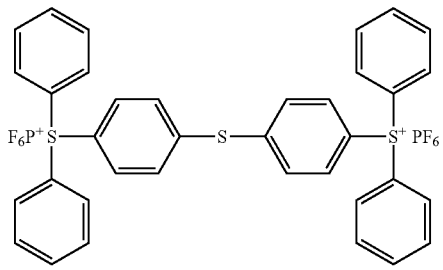

(Chemical Formula 2)

The thermosetting initiator may be any kind where a reaction occurs by heat, and, for example, the thermosetting initiator may include a boric acid-based initiator. The boric acid-based initiator may include a compound represented by the following Chemical Formula 3.

(Chemical Formula 3)

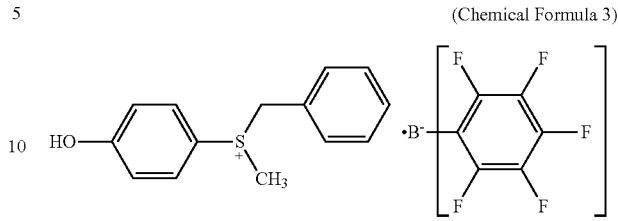

The aforementioned photocurable and thermosetting initiators may be activated by light or heat in a process of forming the coating layer, and monomers may be polymerized by the activated initiator.

A content of the initiator may be about 0.5 wt % to about 8.0 wt %, and, in an exemplary embodiment, is about 2 wt %. This is because in the case where the initiator has the aforementioned content, a reaction speed to light or heat may be appropriately adjusted.

The monomer according to an exemplary embodiment of the present invention may be a hybrimer that is an organic-inorganic hybrid material, and, in an exemplary embodiment, may include a compound represented by the following Chemical Formula 4.

(Chemical Formula 4)

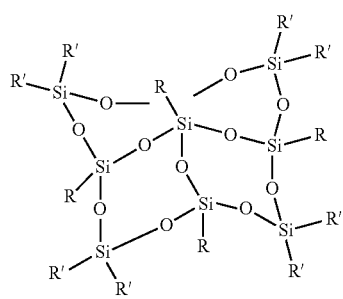

In Chemical Formula 4, R is $CH_3$, and R' is an epoxy group, R' that is the epoxy group may be ring-opened in a curing process, and may be cross-linked through the ring-opened epoxy group.

Based on the total content of the coating solution, a content of the monomer may be about 40 wt % to about 90 wt %, and, in an exemplary embodiment, may be about 80 wt %.

The solvent included according to an exemplary embodiment of the present invention may be methyl ethyl ketone (MEK) but is not limited thereto, and any solvent is feasible.

The thermosetting coating layer 22A and the photocurable coating layer 22B according to an exemplary embodiment of the present invention may be formed by the coating solution having the same constitution with the exception that different initiators are included.

The coating layer 22 formed by the aforementioned coating solution may have hardness required in an external surface of the display device, and may significantly reduce a yellowing phenomenon occurring in the case where the coating layer is exposed to UV and the like over a long period of time. That is, a cover window having improved reliability and durability can be provided.

Figure 2:
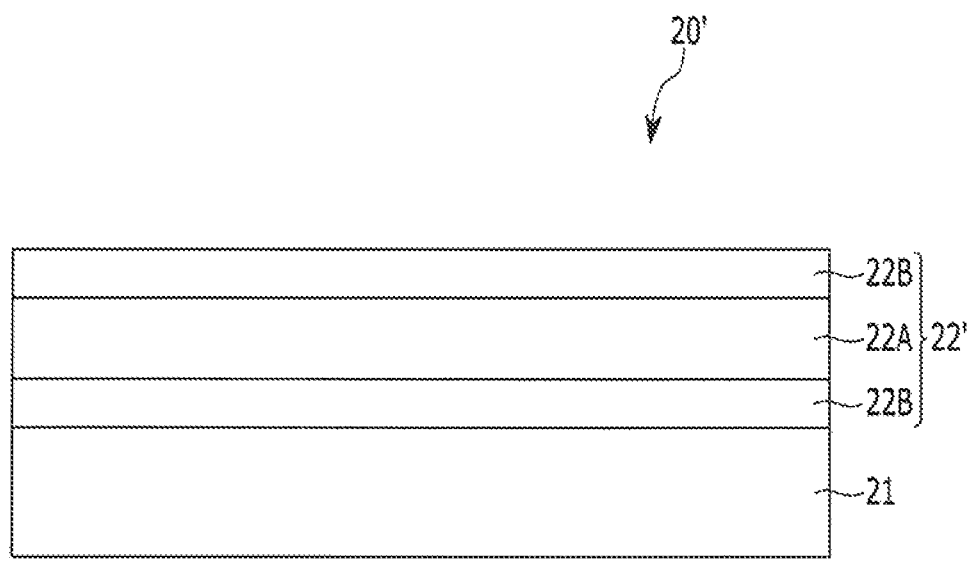
FIG. 2 is a schematic cross-sectional view of a cover window according to another exemplary embodiment of the present invention.

Hereinafter, a cover window according to another exemplary embodiment of the present invention will be described with reference to FIG. 2. FIG. 2 is a schematic cross-Sectional view of a cover window according to another exemplary embodiment of the present invention. A description of constituent elements that are the same as or similar to those of the previously described embodiment of the present invention may be omitted.

A cover window 20' according to another exemplary embodiment of the present invention includes a base film 21 and a coating layer 22' positioned on the base film 21.

The coating layer 22' is formed of a material such as an organic hybrid resin, an inorganic hybrid resin, and/or an acryl resin.

In an exemplary embodiment of the present invention, only the coating layer 22 positioned directly on the base film 21 is described, but embodiments of the present invention are not limited thereto, and any type of cover window is feasible. For example, in addition to the coating film and the base film including the constitution described herein, a constitution including an adhesive layer attaching the coating film and the base film is feasible.

The coating layer 22' according to another exemplary embodiment of the present invention may include one layer of a thermosetting coating layer 22A and two layers of a photocurable coating layer 22B, and the thermosetting coating layer 22A may be positioned between the two layers of the photocurable coating layer 22B. That is, the coating layer 22' according to an exemplary embodiment of the present invention may include a first photocurable coating layer 22B positioned on the base film, the thermosetting coating layer 22A positioned on the first photocurable coating layer 22B, and a second photocurable coating layer 22B positioned on the thermosetting coating layer 22A.

A thickness of the coating layer 22' including the thermosetting coating layer 22A and the photocurable coating layer 22B according to an exemplary embodiment of the present invention may be 100 μm or less, and a sum of thicknesses of both photocurable coating layers 22B may be 40% or less of a total thickness of the coating layer 22'. That is, the total thickness of the photocurable coating layers 22B may be 40 μm or less, and the thickness of the thermosetting coating layer 22A positioned between the photocurable coating layers 22B may be 60 μm or more.

The coating layer 22' according to an exemplary embodiment of the present invention may provide hardness and a yellowing prevention or reduction property at a predetermined level or more through the photocurable coating layer 22B positioned at the outermost region, and may suppress a yellowing phenomenon through the thermosetting coating layer 22A positioned between both photocurable coating layers 22B.

The coating layer 22' according to an exemplary embodiment of the present invention is formed by applying a predetermined coating solution on the base film 21 and curing the coating solution. The coating solution according to an exemplary embodiment of the present invention may include an initiator, a monomer, and a solvent.

The first and second photocurable coating layers 22B according to an exemplary embodiment of the present invention are formed through the coating solution including the photocurable initiator, and the photocurable initiator may be any kind where a reaction occurs according to radiation of light, and, for example, the photocurable initiator may include an iodine-based initiator and a sulfuric acid-based initiator. For example, the iodine-based initiator may include a compound represented by the following Chemical Formula 1, and the sulfuric acid-based initiator may include a compound represented by the following Chemical Formula 2.

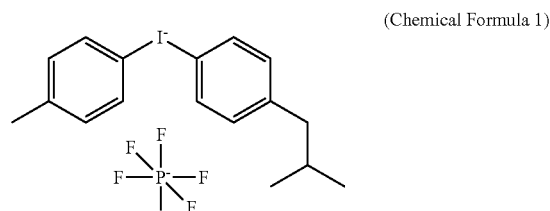

(Chemical Formula 1)

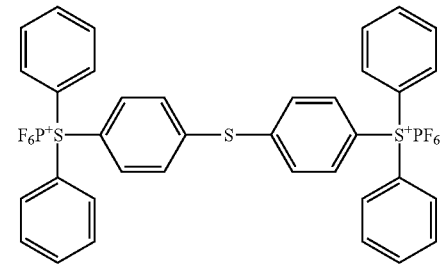

(Chemical Formula 2)

The thermosetting coating layer 22A positioned between the two photocurable coating layers 22B may be formed by the coating solution including the thermosetting initiator. The thermosetting initiator may be any kind where a reaction occurs by heat, and, for example, the thermosetting initiator may include a boric acid-based initiator. The boric acid-based initiator may include a compound represented by the following Chemical Formula 3.

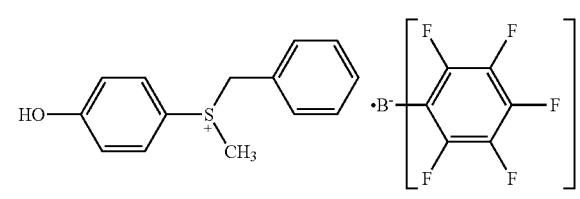

(Chemical Formula 3)

The aforementioned photocurable and thermosetting initiators may be activated by light or heat in a process of forming the coating layer, and the monomers may be polymerized by the activated initiator.

A content of the initiator may be about 0.5 wt % to about 8.0 wt % of the total content of the coating solution, and, in an exemplary embodiment, is about 2 wt %. This is because in the case where the initiator has the aforementioned content, a reaction speed to light or heat may be appropriately adjusted.

The monomer according to an exemplary embodiment of the present invention may be a hybrimer that is an organic-inorganic hybrid material, and, in an exemplary embodiment, may include a compound represented by the following Chemical Formula 4.

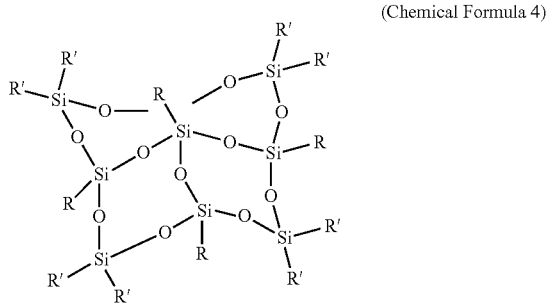

(Chemical Formula 4)

In Chemical Formula 4, R is $CH_3$, and R' is an epoxy group, R' that is the epoxy group may be ring-opened in a curing process, and may be cross-linked through the ring-opened epoxy group.

The solvent included according to the exemplary embodiment of the present invention may be methyl ethyl ketone (MEK), but is not limited thereto.

The aforementioned thermosetting coating layer 22A and photocurable coating layer 22B may have the same constitution with the exception that the different initiators are included.

The coating layer 22' formed by the aforementioned coating solution may have hardness required in an external surface of the display device, and may significantly reduce a yellowing phenomenon occurring in the case where the coating layer is exposed to UV and the like over a long period of time. That is, a cover window having improved reliability and durability can be provided.

Figure 3:
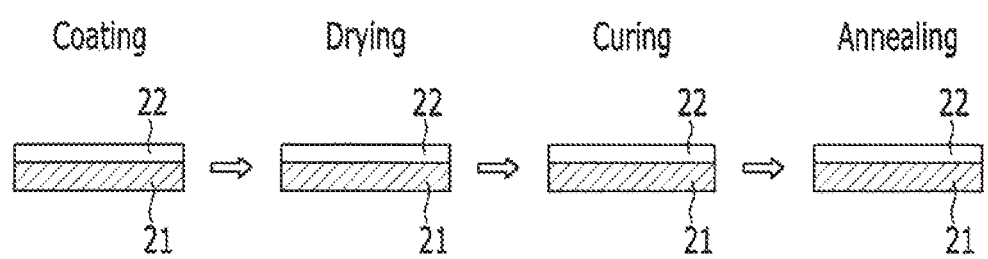
FIG. 3 illustrates a process of manufacturing a cover window according to an exemplary embodiment of the present invention.

Hereinafter, a process of manufacturing a cover window according to an exemplary embodiment of the present invention will be described with reference to FIG. 3. FIG. 3 is a process schematic cross-sectional view illustrating a method of manufacturing a cover window for a display device according to an exemplary embodiment of the present invention.

First, the base film 21 is formed by using polyethylene terephthalate (PET), triacetyl cellulose (TAG), polyimide (PI), polycarbonate (PC), thermoplastic polyurethane (TPU), a silicon rubber, and/or the like.

Subsequently, the coating solution including the thermosetting initiator is applied on the base film 21, and then dried by heat and/or the like to be cured. Next, the coating solution including the photocurable initiator is applied and dried, and then cured through radiation of UV light.

Next, by performing an annealing process over the cured coating solution, the thermosetting coating layer 22A positioned on the base film 21 and the photocurable coating layer 22B positioned on the thermosetting coating layer 22A are formed.

According to an exemplary embodiment of the present invention, the annealing process does not require a separate high humidity condition, and the annealing process may be performed under a normal humidity condition. Therefore, the cover window can be manufactured through the same single-acting equipment as the aforementioned process such as coating and drying of the coating solution. According to the aforementioned manufacturing process, a manufacturing time and a cost can be reduced.

The manufacturing process is not limited thereto, and according to another exemplary embodiment of the present invention, the photocurable coating layer 22B positioned on the base film 21 may be further formed.

Figure 4:
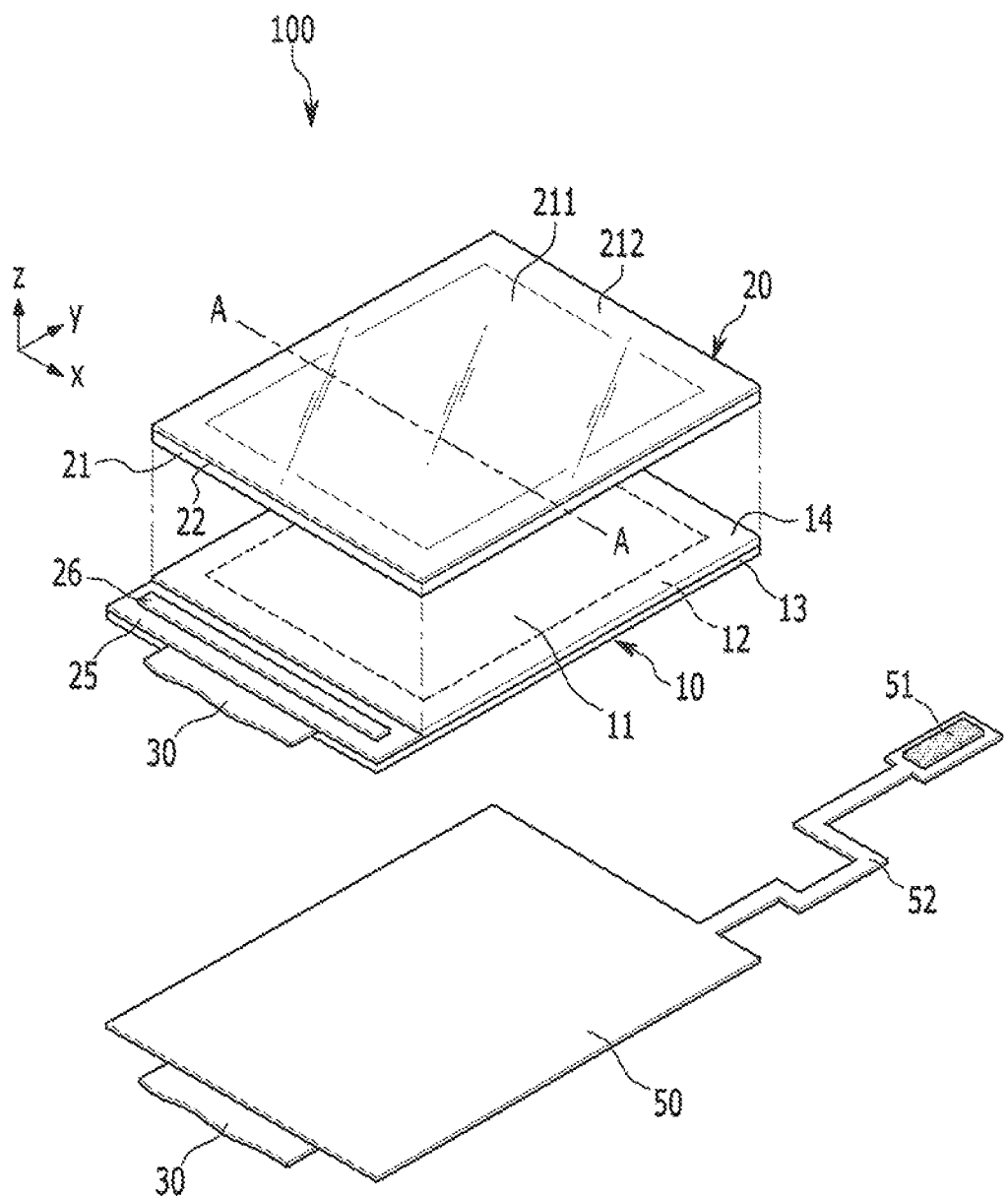
FIG. 4 is an exploded perspective view of a display device according to an exemplary embodiment of the present invention.

A display device according to an exemplary embodiment of the present invention will be described with reference to FIG. 4. FIG. 4 is an exploded perspective view of a display device according to an exemplary embodiment of the present invention.

Referring to FIG. 4, a display device 100 according to an exemplary embodiment of the present invention includes a display panel 10 displaying an image, and a cover window 20 disposed at a front of the display panel 10 to protect the display panel 10.

The display panel 10 may be an organic light emitting display panel. Alternatively, the display panel 10 may be a display panel other than an organic light emitting display panel, such as, for example, a liquid crystal display panel, and the display panel 10 may not include a separate upper substrate, and a display panel where both a field generating electrode and a liquid crystal are included in a lower substrate is feasible. That is, in the present exemplary embodiment, for convenience of the description, the organic light emitting display panel is described as an example, but the present invention is not limited thereto.

The display panel 10 is electrically connected to a printed circuit board 50 through a flexible printed circuit 30.

Pixels that are a basic unit of displaying an image are arranged in a matrix form on a first substrate 13 of the display panel 10, and a second substrate 14 is adhered to the first substrate 13 through a sealing member (not illustrated) to protect the pixels. The first substrate 13 may become a rear surface substrate, and the second substrate 14 may become a front surface substrate.

For example, in an active matrix organic light emitting display panel, a pixel includes an organic light emitting element (not illustrated) constituted by an anode electrode, an organic light emitting layer, and a cathode electrode, and a driving circuit portion (not illustrated) driving the organic light emitting element. The driving circuit portion may be a thin film transistor. A data line is connected to a source terminal of the thin film transistor, and a gate line is connected to a gate terminal in addition, any one electrode of the anode electrode and the cathode electrode of the organic Sight emitting element is connected to a drain terminal.

The data line and the gate line are connected through the flexible printed circuit 30 to the printed circuit board 50. If an electric signal is inputted through the printed circuit board 50 to the source terminal and the gate terminal of the thin film transistor, the thin film transistor is turned on or turned off according to a signal input to output an electric signal required to drive the pixel to the drain terminal.

An integrated circuit chip 26 is mounted on the first substrate 13 to control the display panel 10. The integrated circuit chip 26 generates timing signals for applying a data driving signal and a gate driving signal at an appropriate time. In addition, these signals are each applied to the data line and the gate line of the display panel 10. A passivation layer 25 is formed around the integrated circuit chip 26 to protect the integrated circuit chip 26.

Electronic elements (not illustrated) for treating driving signals are mounted on the printed circuit board 50. The printed circuit board 50 may include a connector 51 and an extension portion 52, and the extension portion 52 may be installed at an end of the connector 51 to transfer an external signal to the printed circuit board 50.

A cover window 20 protecting the display panel 10 is positioned at a front of the display panel 10. The cover window 20 serves to protect the display panel 10 such that the display panel 10 may not be broken by an external impact. In one embodiment, the cover window 20 may be attached to the display panel 10 by a predetermined adhesive layer (not illustrated). In one embodiment, the display panel 10 and the cover window 20 may be formed to be spaced apart from each other, and an air layer may be interposed therebetween.

The display device 100 according to an exemplary embodiment of the present invention may include the cover window 20 according to the aforementioned exemplary embodiment.

The base film 21 includes a transparent portion 211 transparently formed in a region corresponding to a display unit 11 of the display panel 10 such that the display unit 11 may be seen from the outside, and an opaque portion 212 opaquely formed in a region corresponding to a non-display unit 12 of the display panel 10 such that the non-display unit 12 may not be seen from the outside. The opaque portion 212 serves to cover wires, parts, and the like formed in the non-display unit 12 of the display panel 10 such that the wires, parts, and the like are not seen from the outside. In the opaque portion 212, logos of products, ornament patterns, and the like may be included. While it is described herein that the base film 21 is divided into the transparent portion 211 and the opaque portion 212, embodiments of the present invention are not limited thereto, and the base film 21 including only the transparent portion 211 is feasible.

The base film 21 may be formed of polyethylene terephthalate (PET), triacetyl cellulose (TAG), polyimide (PI), polycarbonate (PC), thermoplastic polyurethane (TPU), a silicon rubber, and/or the like.

The coating layer 22 may be formed by applying a predetermined coating solution on the base film 21 and curing the coating solution, and may include the coating layer 22 according to an exemplary embodiment of the present invention or the coating layer 22' according to another exemplary embodiment of the present invention.

The coating layer 22 according to an exemplary embodiment of the present invention may have a predetermined hardness or more, and may reduce a yellowing phenomenon occurring by UV and the like in the coating layer 22. Since the coating layer 22 is described in detail above, hereinafter, further description thereof will be omitted.

The display device 100 according to the present exemplary embodiment may be formed of a bendable material. For example, the display device 100 may be bent according to line A-A, and thus the cover window 20 may be bent according to line A-A.

Figure 5:
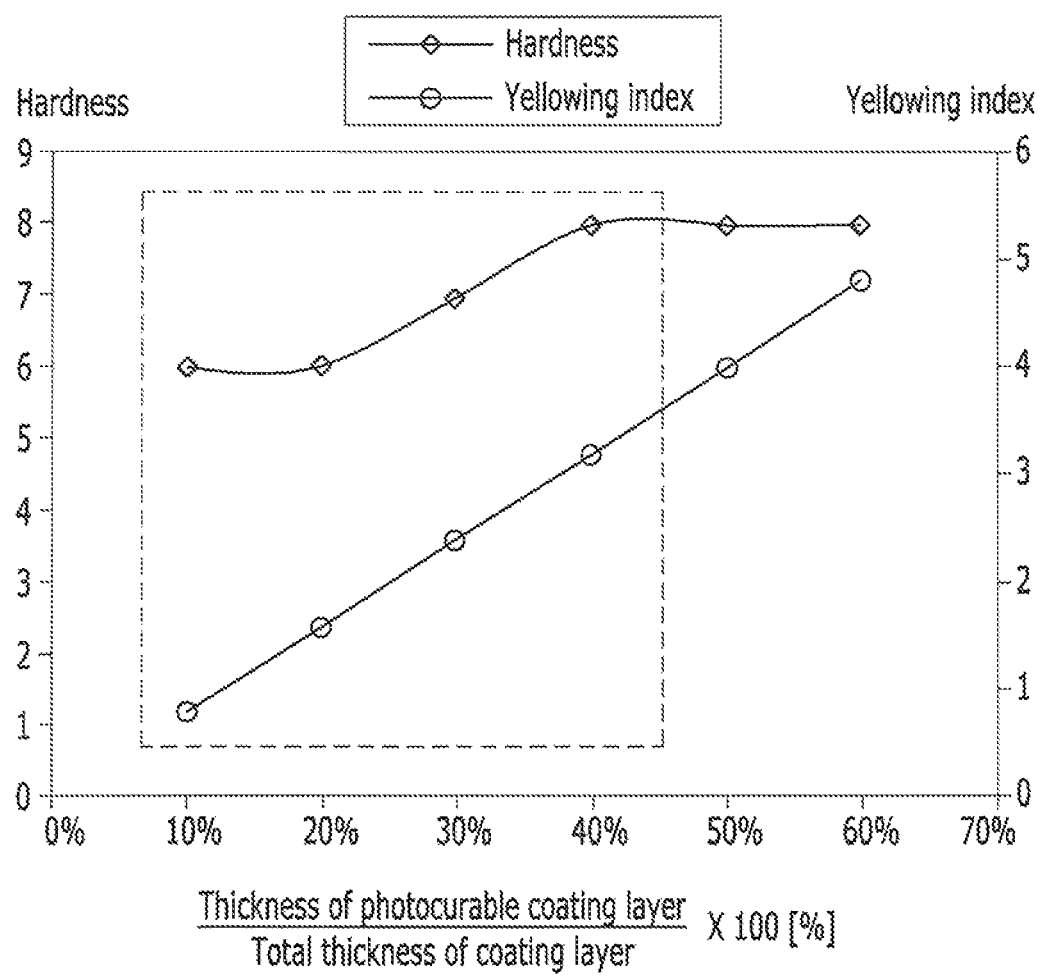
FIG. 5 is a graph of hardness and a yellowing index of a cover window according to some exemplary embodiments of the present invention.
Figure 6:
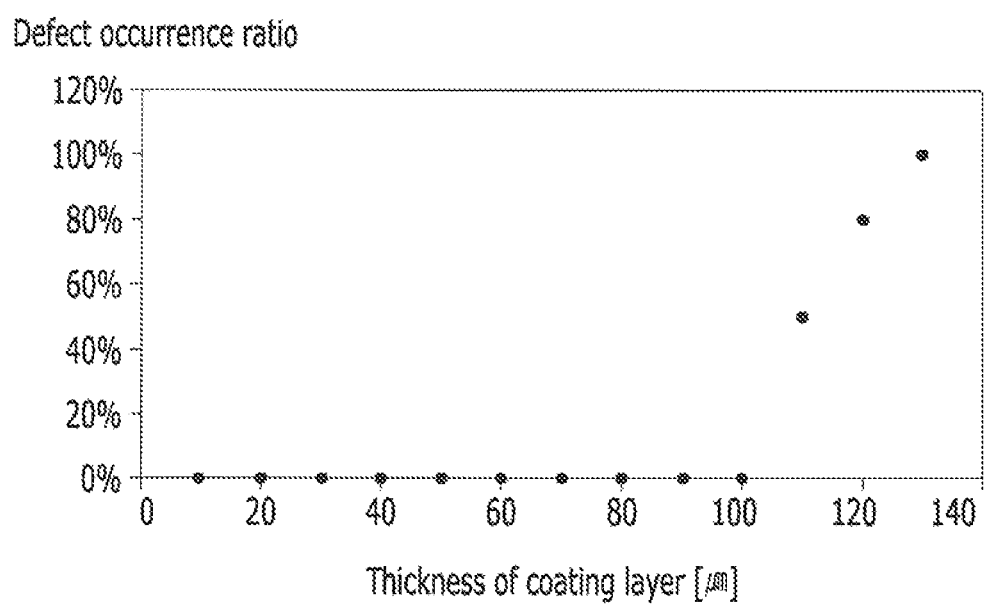
FIG. 6 is a graph of a defect occurrence ratio according to a thickness of a coating layer according to some exemplary embodiments of the present invention.

Hereinafter, some exemplary embodiments of the present invention will be reviewed with reference to FIGS. 5 and 8. FIG. 5 is a graph of hardness and a yellowing index of a cover window according to some exemplary embodiments of the present invention; and FIG. 6 is a graph of a detect occurrence ratio according to a thickness of a coating layer according to some exemplary embodiments of the present invention.

FIG. 5 is a graph of hardness, and a yellowing index according to a thickness ratio of the photocurable coating layer in the coating layer. Hardness and the yellowing index according to an increase in the thickness ratio of the photocurable coating layer will be reviewed with reference to Table 1 below and FIG. 5.

TABLE 1

| | Thickness ratio of photocurable coating layer | | | | | |
|---|---|---|---|---|---|---|
| | 10% | 20% | 30% | 40% | 50% | 60% |
| Hardness | 6H | 6H | 7H | 8H | 8H | 8H |
| Yellowing index | 0.8 | 1.6 | 2.4 | 3.2 | 4 | 4.8 |

Referring to Table 1 and FIG. 5, it can be seen that the yellowing index is increased in proportion to an increase in thickness ratio of the photocurable coating layer. That is, as the thickness ratio of the photocurable coating layer is increased, a possibility of occurrence of the yellowing phenomenon of the cover window is increased.

Next, reviewing hardness according to the thickness ratio of the photocurable coating layer, hardness is about 6 H until the thickness ratio of the photocurable coating layer approaches about 20%, and thereafter, hardness is increased to about 8 H until the ratio approaches 40%. Thereafter, in the case where the thickness ratio of the photocurable coating layer is 40% or more, hardness is maintained at 8 H.

Accordingly, in order to maintain hardness at a predetermined level or more (8 H or less) while minimizing or reducing the yellowing phenomenon, the thickness ratio of the photocurable coating layer should be about 40% or less.

Next, a defect occurrence ratio according to the thickness of the coating layer will be reviewed with reference to FIG. 6. This is because embodiments of the present invention provide a foldable, flexible, or bendable display device and there is a possibility of occurrence of defects due to breakage of the cover window according to an increase in thickness of the coating layer.

As illustrated in FIG. 6, it can be seen that in the case where the thickness of the coating layer is 100 μm or more, breakage of the cover window occurs. Therefore, the thickness of the coating layer according, to exemplary embodiments of the present invention may be 100 μm or less.

According to aspects of the cover window and the display device including the same according to one or more embodiments of the present invention, a yellowing phenomenon is prevented or reduced and a hardness required in the cover window is provided.

While aspects and features of the present invention have been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A display device comprising:
a display panel; and
a cover window positioned on the display panel,
wherein the cover window comprises:
  a base film; and
  a coating layer positioned on the base film,
  wherein the coating layer includes a thermosetting coating layer positioned on the base film and two photocurable coating layers, and
  the thermosetting coating layer comprises a first face and a second face,
  wherein each of the first face and the second face directly contacts a respective one of the two photocurable coating layers, and one of the two photocurable coating layers defines an external surface of the cover window having a hardness of about 6 H to about 8 H,
wherein a thickness of the coating layer is 100 μm or less,
a thickness of the thermosetting coating layer is 60 μm or more of a total thickness of the coating layer, and
wherein the base film includes at least one of polyethylene terephthalate, triacetyl cellulose, polyimide, polycarbonate, thermoplastic polyurethane, and a silicon rubber, and
the base film is a single layer and the base film defines another external surface of the cover window, and
wherein the one of the two photocurable coating layers further defines an external surface of the display device.

2. The display device of claim 1, wherein each of the photocurable coating layers includes at least one of an iodine-based initiator or a sulfuric acid-based initiator.

3. The display device of claim 2, wherein:
the iodine-based initiator includes a compound represented by the following Chemical Formula 1, and
the sulfuric acid-based initiator includes a compound represented by the following Chemical Formula 2:

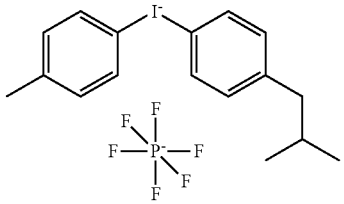

(Chemical Formula 1)

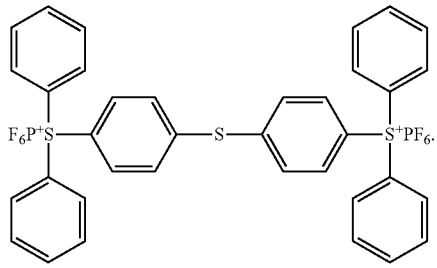

(Chemical Formula 2)

4. The display device of claim 1, wherein the thermosetting coating layer includes a boric acid-based initiator.

5. The display device of claim 4, wherein the boric acid-based initiator includes a compound represented by the following Chemical Formula 3:

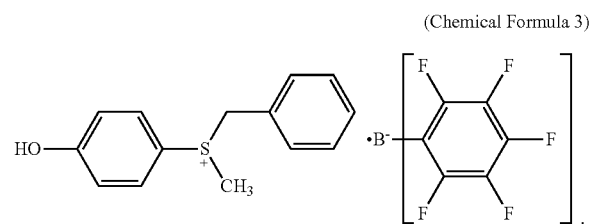

(Chemical Formula 3)

6. The display device of claim 1, wherein a sum of thicknesses of the photocurable coating layers is 40% or less of a total thickness of the coating layer.

* * * * *